Figure 1:
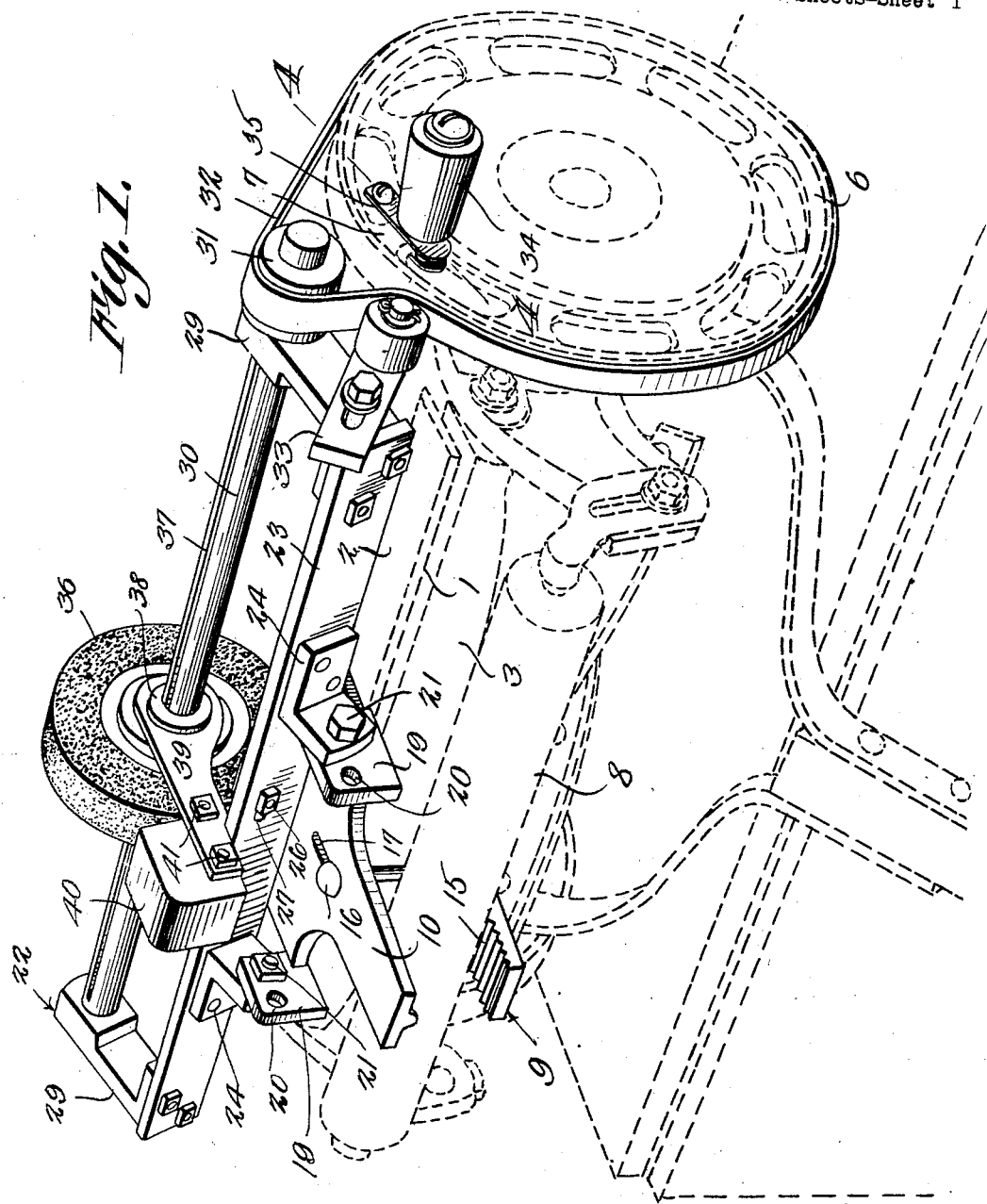

July 21, 1925.

R. STONE

LAWN MOWER SHARPENER

Filed Oct. 2, 1924

1,546,417

2 Sheets-Sheet 1

Inventor
R. Stone
By CA Snow & Co.
Attorneys.

July 21, 1925.
R. STONE
1,546,417
LAWN MOWER SHARPENER
Filed Oct. 2, 1924    2 Sheets-Sheet 2
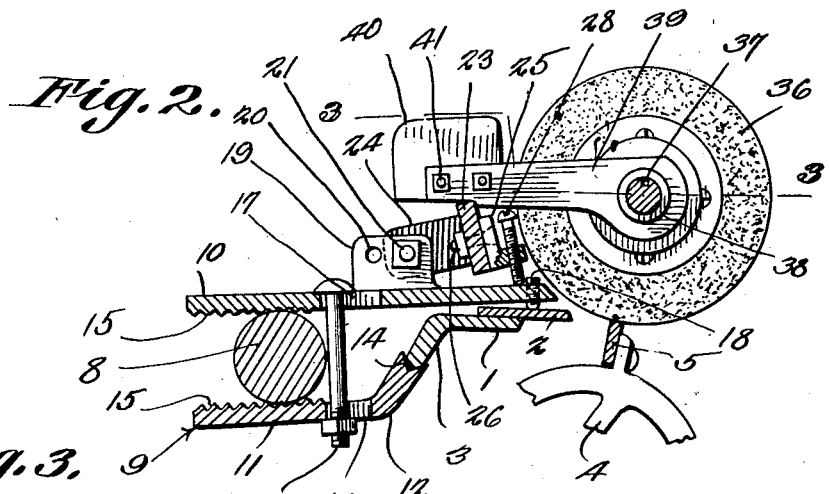
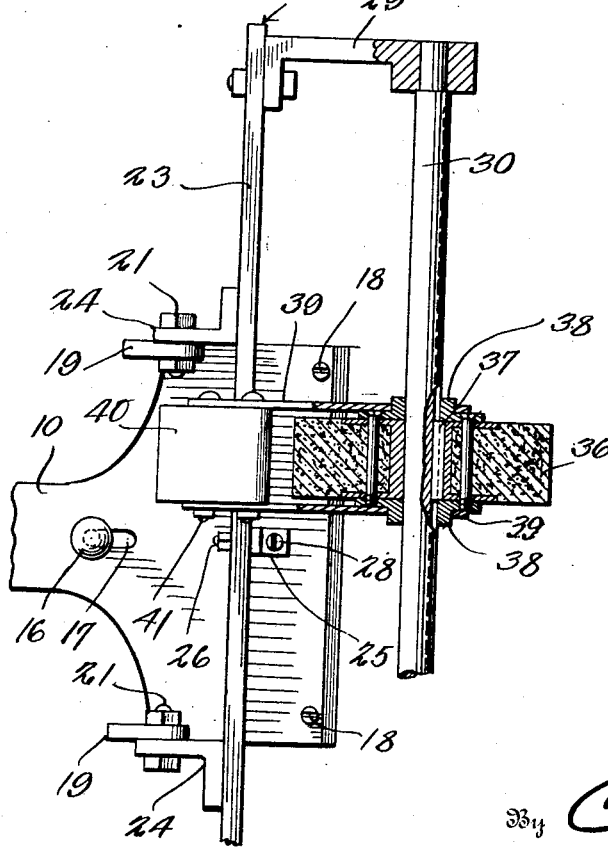
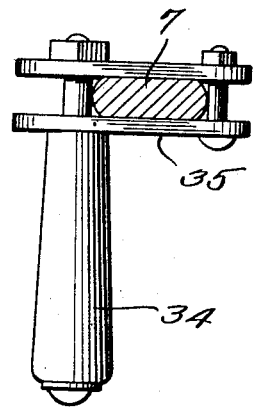
Inventor
R. Stone
By C. A. Snow & Co.
Attorney.

Patented July 21, 1925.

1,546,417

UNITED STATES PATENT OFFICE.

RUDOLPH STONE, OF BAY PORT, MINNESOTA.

LAWN-MOWER SHARPENER.

Application filed October 2, 1924. Serial No. 741,251.

*To all whom it may concern:*

Be it known that I, RUDOLPH STONE, a citizen of the United States, residing at Bay Port, in the county of Washington and State of Minnesota, have invented a new and useful Lawn-Mower Sharpener, of which the following is a specification.

This invention aims to provide novel means whereby the cutter of a lawn mower may be sharpened, novel means being provided for adjusting the position of the grinding element with respect to the cutter, and novel means being provided for rotating the grinding element.

It is within the province of the disclosure to improve generally and to enhance the utility of devices of that sort to which the invention appertains.

Although a preferred embodiment of the invention has been shown, it will be understood that a mechanic, working within the scope of what is claimed, may make alterations, without departing from the spirit of the invention.

In the accompanying drawings:—

Figure 1 shows in perspective, a device of the class described, mounted on a lawn mower; Figure 2 is a transverse section wherein parts are omitted; Figure 3 is a section on the line 3—3 of Figure 2; Figure 4 is a sectional view, showing in elevation, the handle whereby rotation is imparted to one of the wheels of the lawn mower.

The numeral 1 designates a frame member of a lawn mower, including a fixed shear 2, the frame member having an angularly disposed flange 3. The rotor of the mower is designated by the numeral 4 and carries blades 5 cooperating with the shear 2. The wheels 6 of the lawn mower impart rotation to the rotor 4, in the usual way, one of the wheels having a spoke 7. The roller of the lawn mower is journaled on the frame of the mower, as usual, and is designated by the numeral 8.

No novelty is claimed for the parts above described, saving in so far as they may enter into patentable combination with parts hereinafter described.

The device forming the subject matter of this application comprises a clamp, denoted generally by the numeral 9 and including a first member 10 and a second member 11 disposed below the first member, the clamp member 11 having an upstanding lip 12 provided in its edge with a longitudinal seat 14 adapted to receive the edge of the flange 3 of the frame member 1, as shown in Figure 2. The inner surfaces of the clamp members 10 and 11 are supplied with ribs 15 or the like, enhancing the hold of the members 10 and 11 on the roller 8 under the compulsion of a tightening device 16, such as a bolt, mounted for adjustment in longitudinal slots 17 formed in the clamp members 10 and 11, transversely spaced adjusting devices 18, such as screws, being mounted in the clamp member 10 and being adapted to bear on the fixed shear 2. The foregoing description, read especially in connection with Figure 2, will render it evident that the clamp 9 may be mounted securely on the roller 8 and on the elements 2 and 3. The clamp member 10 has upstanding ears 19 provided with openings 20 adapted to receive pivot elements 21 which may be bolts, as shown in the drawings.

A carrier 22 is provided, and is U-shaped in plan, the carrier comprising a main bar 23, rearwardly extended brackets 24 being mounted on the bar 23 and being carried by the pivot elements 21, the construction being such that the carrier 22 may be swung upwardly and downwardly. An angle member 25 is attached by a securing element 26 to the forward surface of the bar 23 of the carrier 22, the securing element being adjustable in a longitudinal slot 27 fashioned in the bar 23, as shown in Figure 1. The angle member 25 carries an adjustable stop, which may be a screw 28, engaging the member 10 of the clamp 9. Forwardly presented arms 29 are secured to the bar 23 and form part of the carrier 22.

In the arms 29, a shaft 30 is journaled for rotation, and held against longitudinal movement, as shown in Figure 3. A pulley 31 is secured to one end of the shaft 30, externally of one of the arms 29. About the pulley 31, a belt 32 is engaged, the belt coacting with one of the wheels 6. The said arm 29 carries a belt tightener 33, of any desired sort, cooperating with the belt 32, and exercising an obvious function. Reverse rotation is imparted to the belt-carrying wheel 6 through the instrumentality of a handle 34 held by a clamp 35 on the spoke 7 of the said wheel. A grinding wheel 36 is splined at 37 to the shaft 30, for rotation with the shaft, and for adjustment longitudinally of the shaft, the grinding wheel 36 having hubs 38. In order to facilitate a shifting of the grinding wheel 36 longitudinally of the shaft 30, an arm is pivoted to the grinding wheel, the arm comprising members 39 mounted for swinging movement on the hubs 38 of the grinding wheel and a handle 40 interposed between the outer ends of the arm members 39, securing elements 41 connecting the arm members with the handle, the securing elements exercising a double function, in that they not only hold the handle 40 between the arm members 39, but, as well, hold the arm members 39 engaged with the hubs 38 of the grinding wheel 36.

The grinding wheel 36 may be adjusted with respect to the blade 5 which is to be sharpened, by way of the stop screw 28. Further, by adjusting the screws 18, the clamp member 10 may be tilted transversely, the bolt 16 being tightened up afterward. From the foregoing, it will be obvious that a proper adjustment between the grinding wheel 28 and the blade 5 may be effected. The arm comprising the members 39 and 40 may be used to slide the grinding wheel 36 along the shaft 30, so that the grinding wheel will coact with all portions of the cutting edge of the blade 5. This arm, further, constitutes a means whereby the carrier 22 may be swung backwardly on its pivotal mountings 21, thereby to move the grinding wheel 36 away from the blade 5. Rotation is imparted to the grinding wheel 36 through a train of elements embodying the shaft 30, the pulley 31, the belt 32, the wheel 6 and the handle 34.

Having thus described the invention, what is claimed is:—

1. In a device of the class described, a clamp comprising members between which the roller and the fixed shear mechanism of a lawn mower may be located, a tightening device connecting the clamp members, a carrier mounted to swing on the clamp, a shaft journaled on the carrier, a grinding member rotatable with the shaft and adjustable therealong, and means for rotating the shaft from the wheel of a lawn mower.

2. In a device of the class described, a clamp comprising members between which the roller and the fixed shear mechanism of a lawn mower may be located, a tightening device connecting the clamp members, a carrier mounted to swing on one clamp member, a shaft journaled on the carrier, a grinding member rotatable with the shaft and adjustable therealong, means for rotating the shaft from the wheel of a lawn mower, and an adjustable stop mounted on the carrier and coacting with said clamp member to limit the swinging movement of the carrier.

3. In a device of the class described, a clamp comprising members between which the roller and the fixed shear mechanism of a lawn mower may be located, a tightening device connecting the clamp members, a carrier mounted to swing on the clamp, a shaft journaled on the carrier, a grinding member rotatable with the shaft and adjustable therealong, means for rotating the shaft from the wheel of a lawn mower, and adjusting devices carried by one member for the clamp, and adapted to cooperate with the fixed shear mechanism to adjust said member of the clamp and the grinding wheel with respect to the blade which is ground by the grinding member.

4. In a device of the class described, a clamp comprising members between which the roller and the fixed shear mechanism of a lawn mower may be located, a tightening device connecting the clamp members, a carrier mounted to swing on the clamp, a shaft journaled on the carrier, a grinding member rotatable with the shaft and adjustable therealong, means for rotating the shaft from the wheel of a lawn mower, and mechanism for adjusting the grinding member along the shaft, said mechanism comprising an arm receiving the grinding member, the arm being mounted at one end to swing on the shaft, and being supported at its other end by the carrier.

In testimony that I claim the foregoing as my own, I have hereto affixed my signature in the presence of two witnesses.

RUDOLPH STONE.

Witnesses:
F. A. GRAMENZ,
EDWARD BELL.